(12) United States Patent
Karimian-Azari et al.

(10) Patent No.: US 10,580,429 B1
(45) Date of Patent: Mar. 3, 2020

(54) SYSTEM AND METHOD FOR ACOUSTIC SPEAKER LOCALIZATION

(71) Applicant: Nuance Communications, Inc., Burlington, MA (US)

(72) Inventors: Sam Karimian-Azari, Burnaby (CA); Dushyant Sharma, Woburn, MA (US); Amr Nour-Eldin, Toronto (CA); Patrick A. Naylor, Reading (GB)

(73) Assignee: Nuance Communications, Inc., Burlington, MA (US)

( * ) Notice: Subject to any disclaimer, the term of this patent is extended or adjusted under 35 U.S.C. 154(b) by 15 days.

(21) Appl. No.: 16/108,959

(22) Filed: Aug. 22, 2018

(51) Int. Cl.
*G10L 21/0232* (2013.01)
*H04R 3/00* (2006.01)
*G10L 21/0264* (2013.01)
*G10L 21/0216* (2013.01)

(52) U.S. Cl.
CPC ...... *G10L 21/0232* (2013.01); *G10L 21/0264* (2013.01); *H04R 3/005* (2013.01); *G10L 2021/02166* (2013.01)

(58) Field of Classification Search
None
See application file for complete search history.

(56) References Cited

U.S. PATENT DOCUMENTS

| | | | | |
|---|---|---|---|---|
| 9,146,301 B2* | 9/2015 | Adcock | ...................... | G01S 5/18 |
| 10,219,083 B2* | 2/2019 | Farmani | ............... | H04R 1/1083 |
| 2003/0185411 A1* | 10/2003 | Atlas | .................... | G10L 21/0208 381/98 |
| 2008/0240463 A1* | 10/2008 | Florencio | ............... | H04R 3/005 381/92 |
| 2008/0247274 A1* | 10/2008 | Seltzer | ................... | G01S 3/8083 367/125 |
| 2011/0178798 A1* | 7/2011 | Flaks | ................... | G10L 21/0208 704/226 |
| 2015/0124975 A1* | 5/2015 | Pontoppidan | ........ | H04R 25/552 381/23.1 |

OTHER PUBLICATIONS

DiBiase et al., "Robust Localization in Reverberant Rooms," in Microphone Arrays—Signal Processing Techniquest and Applications, ch. 8, pp. 157-180.
Valin et al., "Robust Sound Source Localization Using a Microphone Array on a Mobile Robot," Proceedings of the 2003 IEEE/RSJ International Conference on Intelligent Robots and Systems, vol. 2, 2003, pp. 1228-1233.
Wang et al., "Over-determined Source Separation and Localization Using Distributed Microphone," IEEE/ACM Transactions on Audio, Speech, and Language Processing, vol. 24, No. 9, Sep. 2016, pp. 1573-1588.

* cited by examiner

*Primary Examiner* — Paul W Huber
(74) *Attorney, Agent, or Firm* — Brian J. Colandreo; Michael T. Abramson; Holland & Knight LLP

(57) ABSTRACT

A method, computer program product, and computing system for acoustic speech localization, comprising receiving, via a plurality of microphones, a plurality of audio signals. Modulation properties of the plurality of audio signals may be analyzed. Speech sounds may be localized from the plurality of audio signals based upon, at least in part, the modulation properties of the plurality of audio signals.

20 Claims, 8 Drawing Sheets

10

10

10

SYSTEM AND METHOD FOR ACOUSTIC SPEAKER LOCALIZATION

TECHNICAL FIELD

This disclosure relates to signal processing systems and methods and, more particularly, to systems and methods for acoustic speaker localization.

BACKGROUND

Audio source localization (ASL) allows a system to locate a speaker using only the received sound signals. The location of the speakers in a room can then be used in a speaker segmentation application, for example. Furthermore, this information can be used for enhancement, using beamforming techniques for example, where the signal of interest may be enhanced and interfering sounds may be attenuated regarding the location of audio sources. Several approaches have been proposed for ASL. However, performing a robust estimation in high noise and reverberation conditions is still a challenging problem.

Common approaches estimate the location of the sound directly from the time delay of arrival (TDOA) between pairs of microphones, or the direction-of-arrival (DOA) of impinging sound waves to a microphone array, based on the sound wave propagation model of direct-path sound waves and the positioning of microphones. The most popular technique for TDOA estimation is based on cross-correlations between pairs of microphones, the most popular being the Generalized Cross-Correlation of the Phase Transform (GCC-PHAT), which estimates the TDOA from phase difference between narrowband signals in the frequency domain. The GCC-PHAT method emphasizes the phase differences in all frequency bins equally, which introduces sensitivity to broadband noise. Non-uniform spectral weighting of the PHAT, which uses narrowband signal-to-noise ratio (SNR), lessens the contribution of frequencies with low narrowband SNR and provides robustness against noise. However, sub-optimal estimation of narrowband SNR degrades the performance of the non-uniform PHAT weighting, for instance, in the presence of coherent broadband noise introduced by reverberation, may generate a false TDOA. While several viable solutions exist in non-coherent noise reduction and SNR estimation, coherent noise reduction (de-reverberation) and coherent noise estimation are still challenging problems.

SUMMARY OF DISCLOSURE

In one implementation, a computer-implemented method for acoustic speech localization is executed on a computing device and includes receiving, via a plurality of microphones, a plurality of audio signals. Modulation properties of the plurality of audio signals may be analyzed at the computing device. Speech sounds may be localized from the plurality of audio signals based upon, at least in part, the modulation properties of the plurality of audio signals.

One or more of the following features may be included. Analyzing the modulation properties of the plurality of audio signals may include modeling the plurality of audio signals in the modulation domain as a plurality of carrier signals and a plurality of modulator signals. A subset of the plurality of modulator signals of the plurality audio signals may be filtered, via one or more filters. One or more signals associated with one or more modulator signals may be subtracted from the plurality of modulator signals of the plurality of audio signals. Localizing speech sounds from the plurality of audio signals may include computing a cross-correlation of the plurality of audio signals received by one or more pairs of microphones of the plurality of microphones. Localizing speech sounds from the plurality of audio signals may include applying a weight mask to at least a subset of the plurality of audio signals based upon, at least in part, a signal-to-noise ratio (SNR) of the plurality of audio signals. The weight may be applied based upon at least in part a probability of speech sounds being present in at least a portion of the plurality of audio signals.

In another implementation, a computer program product resides on a computer readable medium and has a plurality of instructions stored on it. When executed by a processor, the instructions cause the processor to perform operations including receiving, via a plurality of microphones, a plurality of audio signals. Modulation properties of the plurality of audio signals may be analyzed. Speech sounds may be localized from the plurality of audio signals based upon, at least in part, the modulation properties of the plurality of audio signals.

One or more of the following features may be included. Analyzing the modulation properties of the plurality of audio signals may include modeling the plurality of audio signals in the modulation domain as a plurality of carrier signals and a plurality of modulator signals. A subset of the plurality of modulator signals of the plurality audio signals may be filtered, via one or more filters. One or more signals associated with one or more modulator signals may be subtracted from the plurality of modulator signals of the plurality of audio signals. Localizing speech sounds from the plurality of audio signals may include computing a cross-correlation of the plurality of audio signals received by one or more pairs of microphones of the plurality of microphones. Localizing speech sounds from the plurality of audio signals may include applying a weight mask to at least a subset of the plurality of audio signals based upon, at least in part, a signal-to-noise ratio (SNR) of the plurality of audio signals. The weight may be applied based upon at least in part a probability of speech sounds being present in at least a portion of the plurality of audio signals.

In another implementation, a computing system includes a processor and memory is configured to perform operations including receiving, via a plurality of microphones, a plurality of audio signals. Modulation properties of the plurality of audio signals may be analyzed. Speech sounds may be localized from the plurality of audio signals based upon, at least in part, the modulation properties of the plurality of audio signals.

One or more of the following features may be included. Analyzing the modulation properties of the plurality of audio signals may include modeling the plurality of audio signals in the modulation domain as a plurality of carrier signals and a plurality of modulator signals. A subset of the plurality of modulator signals of the plurality audio signals may be filtered, via one or more filters. One or more signals associated with one or more modulator signals may be subtracted from the plurality of modulator signals of the plurality of audio signals. Localizing speech sounds from the plurality of audio signals may include computing a cross-correlation of the plurality of audio signals received by one or more pairs of microphones of the plurality of microphones. Localizing speech sounds from the plurality of audio signals may include applying a weight mask to at least a subset of the plurality of audio signals based upon, at least in part, a signal-to-noise ratio (SNR) of the plurality of audio signals. The weight may be applied based upon at least in part a probability of speech sounds being present in at least a portion of the plurality of audio signals.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
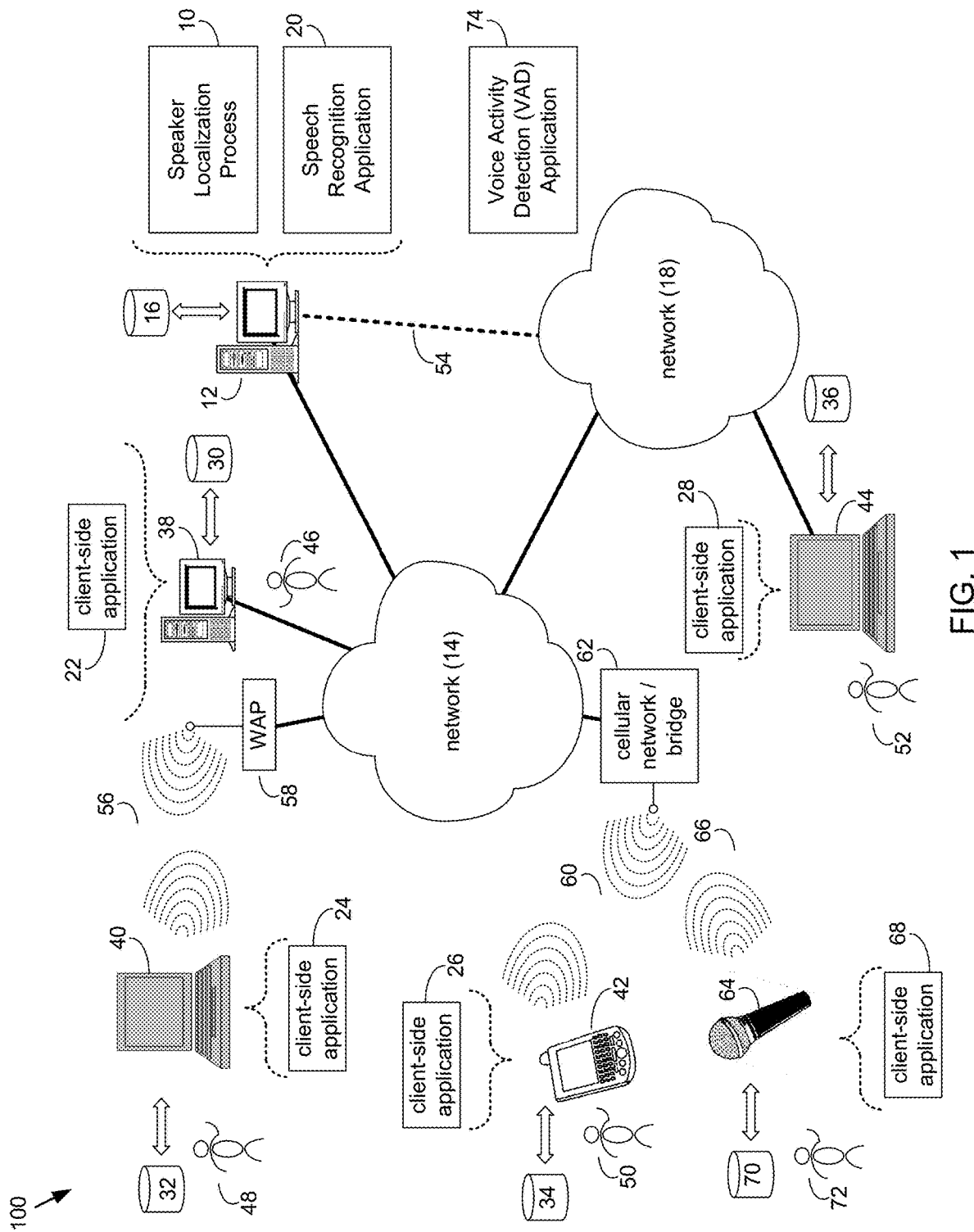
FIG. 1 is a diagrammatic view of a speaker localization process coupled to a distributed computing network.
Figure 2:
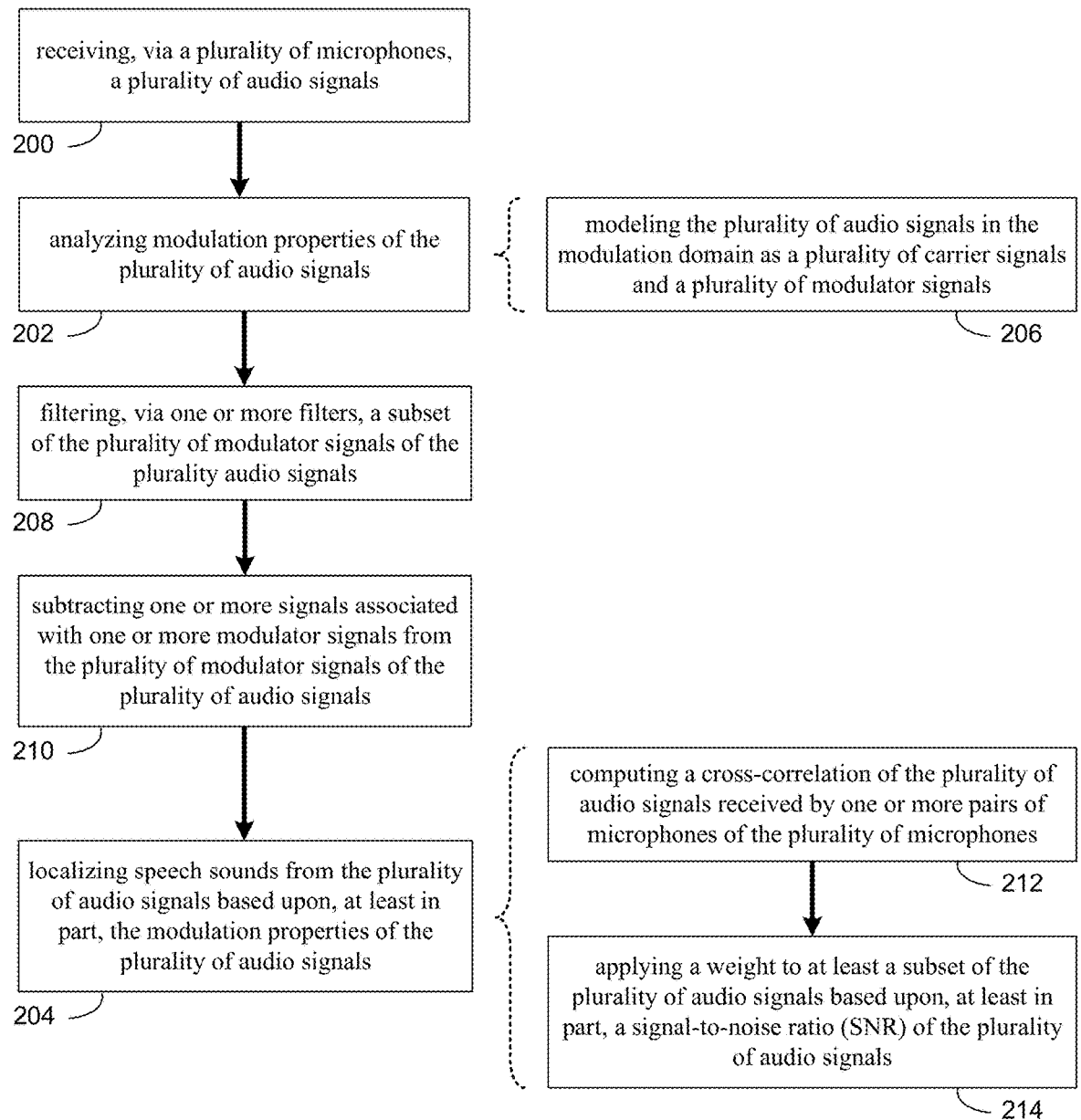
FIG. 2 is a flow chart of one implementation of the speaker localization process of FIG. 1.

Referring now to FIG. 1, there is shown speaker localization process 10 that may reside on and may be executed by a computing device 12, which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, a speaker localization process, such as speaker localization process 10 of FIG. 1, receive, via a plurality of microphones, a plurality of audio signals. Modulation properties of the plurality of audio signals may be analyzed. Speech sounds may be localized from the plurality of audio signals based upon, at least in part, the modulation properties of the plurality of audio signals.

The instruction sets and subroutines of speaker localization process 10, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Speaker localization process 10 may be a stand-alone application that interfaces with an applet/application that is accessed via client applications 22, 24, 26, 28, 66. In some embodiments, speaker localization process 10 may be, in whole or in part, distributed in a cloud computing topology. In this way, computing device 12 and storage device 16 may refer to multiple devices, which may also be distributed throughout network 14 and/or network 18.

Computing device 12 may execute a speech recognition application (e.g., speech recognition application 20), examples of which may include, but are not limited to, automated speech recognition (ASR) programs and applications, speech-to-text (SST) programs and applications, computer speech recognition programs and applications, voice recognition programs and applications, In-vehicle voice command programs and applications, etc. including those available from Nuance Communications, Inc. of Burlington, Mass. Speaker localization process 10 and/or speech recognition application 20 may be accessed via client applications 22, 24, 26, 28, 68. Speaker localization process 10 may be a stand-alone application, or may be an applet/application/script/extension that may interact with and/or be executed within speech recognition application 20, a component of speech recognition application 20, and/or one or more of client applications 22, 24, 26, 28, 68. Speech recognition application 20 may be a stand-alone application, or may be an applet/application/script/extension that may interact with and/or be executed within speaker localization process 10, a component of speaker localization process 10, and/or one or more of client applications 22, 24, 26, 28, 68. One or more of client applications 22, 24, 26, 28, 68 may be a stand-alone application, or may be an applet/application/script/extension that may interact with and/or be executed within and/or be a component of speaker localization process 10 and/or speech recognition application 20. Examples of client applications 22, 24, 26, 28, 68 may include, but are not limited to, applications that receive queries to search for content from one or more databases, servers, cloud storage servers, etc., a textual and/or a graphical user interface, a customized web browser, a plugin, an Application Programming Interface (API), or a custom application. The instruction sets and subroutines of client applications 22, 24, 26, 28, 68 which may be stored on storage devices 30, 32, 34, 36, coupled to client electronic devices 38, 40, 42, 44 may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Microsoft® Windows®; Mac® OS X®; Red Hat® Linux®, Windows® Mobile, Chrome OS, Blackberry OS, Fire OS, or a custom operating system.

One or more of client applications 22, 24, 26, 28, 68 may be configured to effectuate some or all of the functionality of speaker localization process 10 (and vice versa). Accordingly, speaker localization process 10 may be a purely server-side application, a purely client-side application, or a hybrid server-side/client-side application that is cooperatively executed by one or more of client applications 22, 24, 26, 28, 68 and/or speaker localization process 10.

One or more of client applications 22, 24, 26, 28, 68 may be configured to effectuate some or all of the functionality of speech recognition application 20 (and vice versa). Accordingly, speech recognition application 20 may be a purely server-side application, a purely client-side application, or a hybrid server-side/client-side application that is cooperatively executed by one or more of client applications 22, 24, 26, 28, 68 and/or speech recognition application 20. As one or more of client applications 22, 24, 26, 28, 68 speaker localization process 10, and speech recognition application 20, taken singly or in any combination, may effectuate some or all of the same functionality, any description of effectuating such functionality via one or more of client applications 22, 24, 26, 28, 68 speaker localization process 10, speech recognition application 20, or combination thereof, and any described interaction(s) between one or more of client applications 22, 24, 26, 28, 68 speaker localization process 10, speech recognition application 20, or combination thereof to effectuate such functionality, should be taken as an example only and not to limit the scope of the disclosure.

Users 46, 48, 50, 52 may access computing device 12 and speaker localization process 10 (e.g., using one or more of client electronic devices 38, 40, 42, 44) directly or indirectly through network 14 or through secondary network 18. Further, computing device 12 may be connected to network 14 through secondary network 18, as illustrated with phantom link line 54. Speaker localization process 10 may include one or more user interfaces, such as browsers and textual or graphical user interfaces, through which users 46, 48, 50, 52 may access speaker localization process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 800.11a, 800.11b, 800.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14. In some implementations, audio recording device 64 may be wirelessly coupled to network 14 via wireless communication channel 66 established between client electronic device 42 and cellular network/bridge 62, which is shown directly coupled to network 14. Storage device 70 may be coupled to audio recording system 64 and may include but is not limited to: hard disk drives; flash drives, tape drives; optical drives; RAID arrays; random access memories (RAM); and read-only memories (ROM). User 72 may access computing device 12 and speaker localization process 10 (e.g., using one or more of audio recording system 64) directly or indirectly through network 14 or through secondary network 18.

Some or all of the IEEE 800.11x specifications may use Ethernet protocol and carrier sense multiple access with collision avoidance (i.e., CSMA/CA) for path sharing. The various 800.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

As discussed above and referring also at least to FIGS. 2-10, speaker localization process 10 may receive 200, via a plurality of microphones, a plurality of audio signals. Modulation properties of the plurality of audio signals may be analyzed 202 at the computing device. Speech sounds may be localized 204 from the plurality of audio signals based upon, at least in part, the modulation properties of the plurality of audio signals.

In some implementations consistent with the present disclosure, systems and methods may be provided for acoustic speaker localization. Acoustic speaker localization may generally include using the audio signal from a number of microphones (arranged into an array of known geometry) to find the direction of the sound source, in an unknown acoustic environment. The effectiveness of traditional localization techniques is limited by the level of background noise and reverberation. As will be discussed in greater detail below, implementations of the present disclosure may allow for improvements in the field of acoustic speaker localization by utilizing the modulation properties of a speech signal. As will also be discussed in greater detail below, it will be observed that implementations of the present disclosure outperform the well-established steered response power with phase transform (SRP-PHAT) method in low SNR noise conditions, even with a smaller number of microphones (e.g., 2 to 8). In some implementations, using the modulation properties of speech to estimate a weight mask may lead to a more robust system, providing additional advantages when deploying such a system in the field. Moreover, in the construction of weight masks, implementations of the present disclosure may make or require minimum assumptions about speaker, room, or microphone characteristics; leading to a more general and robust solution.

In some implementations, speaker localization process 10 may receive 200, via a plurality of microphones, a plurality of audio signals. Audio signals or acoustic signals may generally include acoustic or sound waves that propagate from a source. In some implementations, an audio recording device (e.g., audio recording device 64) may include a plurality of microphones or other sound sensors configured to receive 200 or sample a plurality of audio signals. As is known in the art, a microphone or series of microphones may convert audio signals into electrical signal representations. In some implementations, the audio recording device may include a multi-channel array of microphones. For example, the audio recording device may include a number of microphones arranged into an array of a known geometry. In some implementations, the audio recording device may, for example, include a uniform linear array (ULA) of microphones. It will be appreciated that any number of microphones may be used within an array of microphones and/or as an audio recording device. It will also be appreciated that speaker localization process 10 may use an array of microphones of any geometry within the scope of the present disclosure. In some implementations, an array with at least two microphones may be used to receive 200 the plurality of audio signals. It will also be appreciated that multiple audio recording devices (e.g., multiple microphone arrays) may be used within the scope of the present disclosure.

In some implementations and as will be discussed in greater detail below, audio recording devices may receive and/or record audio signals which may include sounds of interest (e.g., speech) and undesirable sounds (e.g., noise, music, babble sounds, etc.). As will be discussed in greater detail below, speech sounds may generally include speech sounds produced by a speaker that may be received 200 in the audio signals by the plurality of microphones. Noise sounds may generally include non-speech sounds received 200 in the audio signals by the plurality of microphones. In some implementations, noise sounds may include speech sounds of interfering speakers.

Figure 3:
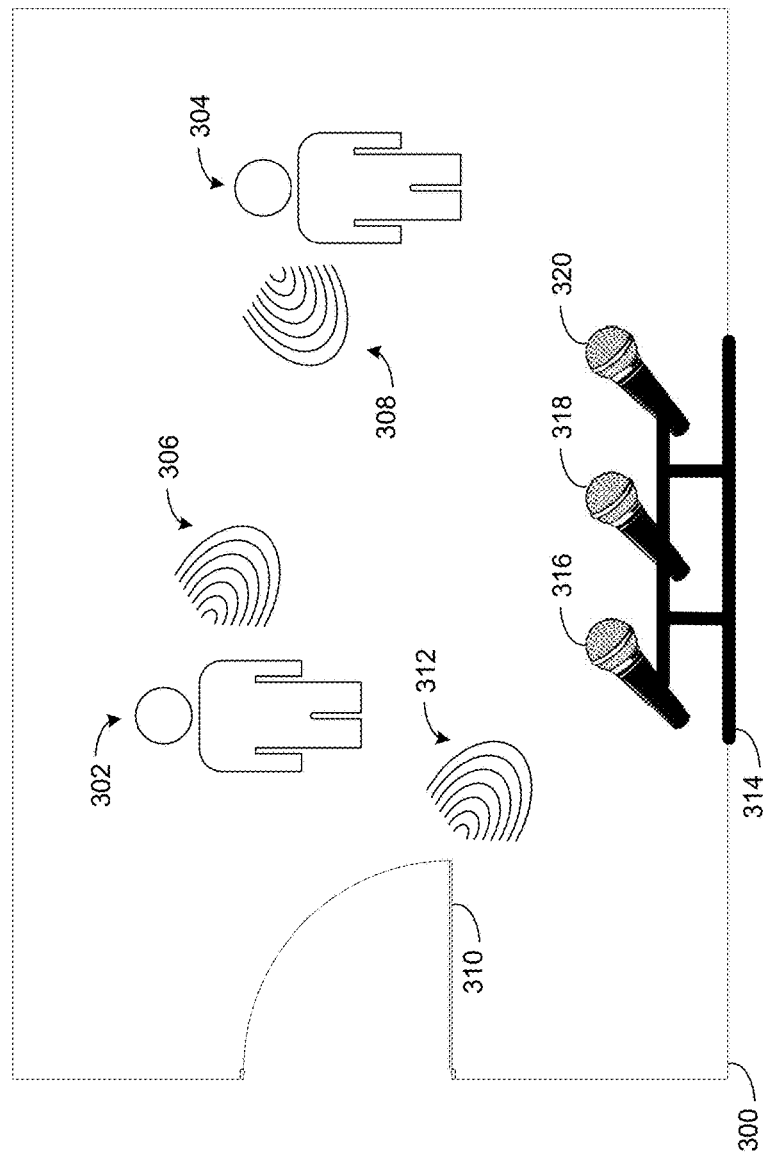
FIG. 3 is a diagrammatic view of a plurality of speakers in a room according to one implementation of the speaker localization process of FIG. 1.

Referring also to FIG. 3 and in some implementations, a plurality of audio signals may be received in a room (e.g., room 300) with a plurality of speakers (e.g., speakers 302, 304). In some implementations, the plurality of speakers may act as sources for speech sounds (e.g., speech sounds 306, 308). In some implementations, noisy sounds may be generated by other, non-speaker sources and/or interfering speakers. For example, a door (e.g., door 310) may close and create a slamming sound (e.g., noise sound 312). In combination, each of the speech sounds (e.g., speech sounds 306, 308) and the noise sound (e.g., noise sound 312) may be received by an array of microphones (e.g., microphone array 314) or other audio recording device (e.g., audio recording device 64) as a plurality of audio signals. In some implementations, the array of microphones (e.g., microphone array 314) may include a plurality of microphones. In the example of FIG. 3, three microphones (e.g., microphones 316, 318, 320) are shown. However, it will be appreciated that any number of microphones may be used in a microphone array within the scope of the present disclosure. In some implementations, an array with at least two microphones may be used to receive 200 the plurality of audio signals.

In some implementations, speaker localization process 10 may analyze 202, at a computing device, modulation properties of the plurality of audio signals. As will be discussed in greater detail below, speaker localization process 10 may localize 204 speech sounds from the plurality of audio signals based upon, at least in part, the modulation properties of the plurality of audio signals. Modulation properties of audio signals may generally include the combination of modulator signals and carrier signals to form audio signals. As known in the art, modulation generally includes modulating a carrier signal with a modulator signal such that the "information" described or encoded in the modulator signal is conveyed via modulations to a carrier signal. For example, a carrier signal may encode a modulator signal by varying amplitude based on the modulator signal (i.e., amplitude modulation), by varying frequency based on the modulator signal (i.e., frequency modulation), by varying phase based on the modulator signal (i.e., phase modulation, and/or by varying a combination of amplitude, frequency, and/or phase of the modulator signal.

Figure 4:
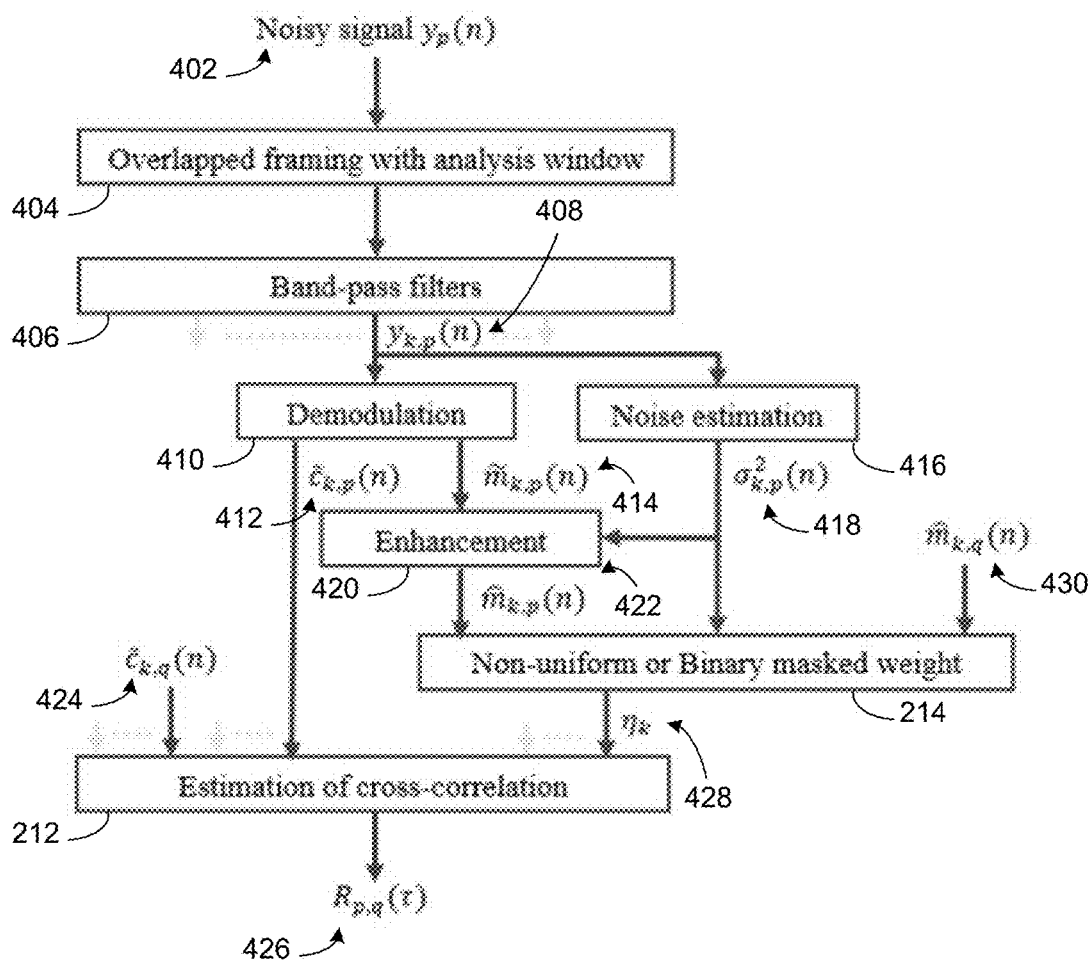
FIG. 4 is a flow chart of one implementation of the speaker localization process of FIG. 1.

Referring also to FIG. 4 and in some implementations, audio signals may be represented or measured in the time, frequency, and/or modulation domains. In the time domain, an audio signal's amplitude or power may be observed as a function of time. In the frequency domain, an audio signal's amplitude or power may be observed as a function of frequency of the audio signal. In the modulation domain, an audio signal's power may be observed as a function of both frequency and time. In some implementations, an audio signal may be modeled in the modulation domain by applying a Short-Time Fourier Transform (STFT). While a STFT is discussed as a way of modeling the audio signal in the modulation domain, it will be appreciated that other transformations may be used to model an audio signal in the modulation domain within the scope of the present disclosure. Applying a STFT to an audio signal may include applying 404 overlapped framing with an analysis window. For example, an audio signal (e.g., received audio signal 402) may be recorded by an audio recording device (e.g., audio recording device 64) as a time waveform in the time domain. Speaker localization process 10 may convert the time waveform of the audio signal into a sequence of short excerpts of the time waveform. Speaker localization process 10 may convert each of the short excerpts to the frequency domain by applying a Fourier transform in combination with a window function, where such window functions are known in the art. Additionally, one or more band-pass filters may be applied 406 and the received signal may be converted by speaker localization process 10 to a plurality of audio signals for a plurality of frequency bands (e.g., audio signal 408). As is known in the art, the frequency bands or frequency bins from the Fourier transform may be combined with the time windows to form a plurality of time frequency spectrum cells. The power or amplitude of the audio signals may be defined relative to time and frequency in each the time frequency spectrum cells. As will be discussed in greater detail below, certain time frequency spectrum cells may include or contribute to speech sounds while other time frequency spectrum cells may not include or may not contribute to speech sounds.

For example and in some implementations, analyzing 202 the modulation properties of the plurality of audio signals may include modeling 206 the plurality of audio signals in the modulation domain as a plurality of carrier signals and a plurality of modulator signals. In some implementations, audio signals with speech sounds can be modeled 206 by speaker localization process 10 as the sum of the product of low-frequency temporal envelopes/modulator signals and carrier signals. For example, an audio signal or acoustic signal $x_p(n)$ with time index n may comprise discrete temporal samples at each of $p=1, \ldots, P$ microphones of an array (e.g., audio recording device 64). In some implementations, the audio signal may be the sum of analytic signals in k=1, 2, ..., K frequency bands. The analytic signals are quasi-sinusoidal tones which are modulated by temporal amplitudes, $m_{k,p}(n)$, representing low-frequency temporal envelopes which may be represented as shown below in Equation 1.

$$x_p(n) = \sum_{k=0}^{K-1} x_{k,p}(n) = \sum_{k=0}^{K-1} m_{k,p}(n) c_{k,p}(n) \quad (1)$$

where $c_{k,p}(n)$ represents the carrier signals or carriers.

In some implementations, the modulator signal or modulator may be the Hilbert envelope of the analytic signal in each frequency band. Therefore, the modulator is real-valued and non-negative, and the carrier is unit-magnitude as shown below in Equation 2.

$$c_{k,p}(n) = e^{j\phi_{k,p}(n)} \quad (2)$$

where $\phi_{k,p}(n)$ is the discrete sample of instantaneous phase which is a continuous function of time.

In some implementations, speaker localization process 10 may model 206 the plurality of audio signals in the modulation domain as a plurality of carrier signals and a plurality of modulator signals. For example, in addition to the modulator and carrier-based representations of audio signals, additive noise, $v_{k,p}$ may represented in the model 206 of the plurality of audio signals and may include random magnitude, $b_{k,p}$ and phase, $\psi_{k,p} \in (\pi, -\pi]$. Additionally, speaker localization process 10 may model 206 the effect of reverberation in a room by a source to microphone impulse response, which may be defined as a convolution with source speech in the time domain, or multiplied with the analytical signal in the frequency domain, i.e., $x_{k,p} h_{k,p}$, where $h_{k,p}$ is the frequency response of the room (e.g., room 300). Therefore, speaker localization process 10 may model 206 each audio signal observed as shown below in Equations 3-5.

$$y_{k,p} = m_{k,p} e^{j\phi_{k,p}} + x_{k,p} h_{k,p} + b_{k,p} e^{j\psi_{k,p}} \text{ where } x_{k,p} = \quad (3)$$
$$m_{k,p} e^{j\phi_{k,p}} \text{ and } v_{k,p} = b_{k,p} e^{j\psi_{k,p}}.$$

$$y_{k,p} = x_{k,p}\left[1 + h_{k,p} + \frac{b_{k,p}}{m_{k,p}} e^{-j(\phi_{k,p} - \psi_{k,p})}\right] \quad (4)$$

$$y_{k,p} = x_{k,p} \sqrt{A^2 + B^2} \, e^{j \arctan\left(\frac{B}{A}\right)} \text{ where } A = \quad (5)$$
$$1 + |h_{k,p}|\cos(\angle h_{k,p}) + \frac{b_{k,p}}{m_{k,p}}\cos(\phi_{k,p} - \psi_{k,p}) \text{ and } B =$$
$$|h_{k,p}|\sin(\angle h_{k,p}) - \frac{b_{k,p}}{m_{k,p}}\sin(\phi_{k,p} - \psi_{k,p}).$$

Figure 5:
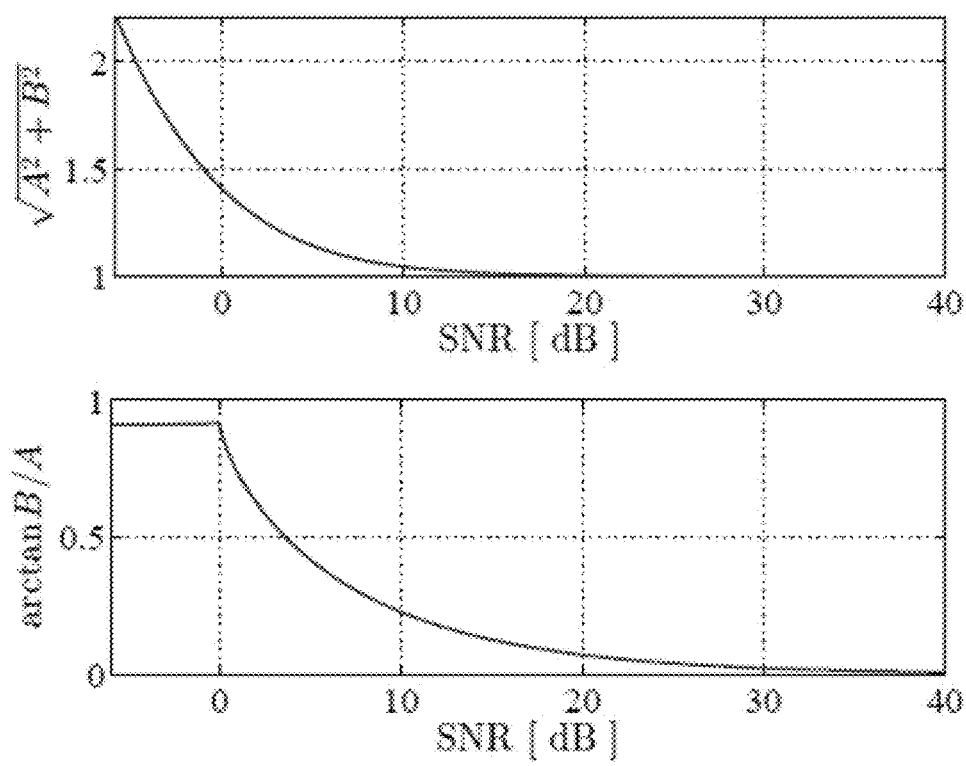
FIG. 5 is a diagrammatic view of distortions on magnitude (top graph) and distortions in phase (bottom graph) of a noisy signal with respect to narrowband signal-to-noise (SNR) ratio, in an anechoic room according to one implementation of the speaker localization process of FIG. 1.

Referring also to FIG. 5, it may be observed from Equations 3-5 and FIG. 5 that noise causes distortions in both magnitude and phase spectra of the audio signal and that the distortions vary exponentially with the noise level. In some implementations, the distortion in phase, $\varepsilon_{k,p}$ may tend exponentially as shown in Equation 6 below to high signal-to-noise ratio (SNR), and zero in anechoic environments (i.e., $h_{k,p}=0$).

$$\varepsilon_{k,p} = \arctan \frac{|h_{k,p}|\sin(\angle h_{k,p})}{1 + |h_{k,p}|\cos(\angle h_{k,p})} \quad (6)$$

Figure 6:
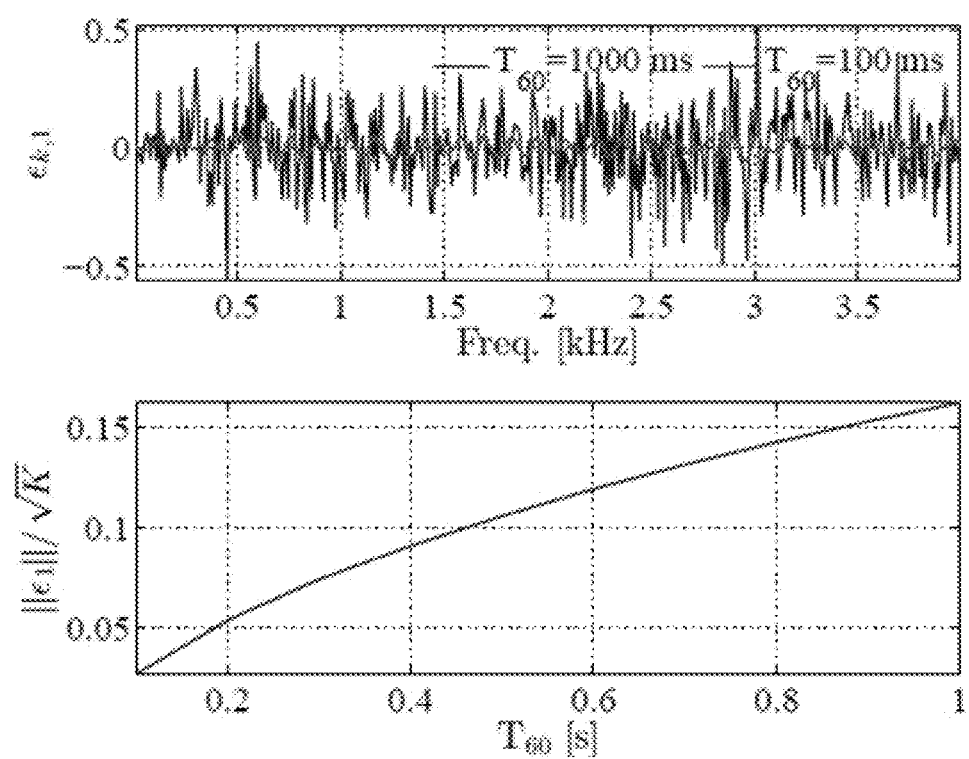
FIG. 6 is a diagrammatic view of distortions on phase of a signal according to acoustic frequency (top graph) and standard distributions of the distortions throughout the frequencies with respect to reverberation time (bottom graph) according to one implementation of the speaker localization process of FIG. 1.

In some implementations with reverberant environments, the distortion at each frequency bin may depend upon the acoustic properties of the room and the location of the target speaker. For example and as shown in FIG. 6, in a reverberant environment, the distortion may be random and the standard distribution throughout the frequencies may depend of the reverberation time, $T_{60}$.

Referring again to FIG. 4 and in some implementations, speaker localization process 10 may demodulate 410 the modeled audio signal (e.g., audio signal 408) into a plurality of carrier signals (e.g., carrier signal 412) and a plurality of noisy modulator signals (e.g., noisy modulator signal 414). In some implementations, the noise-corrupted version of the audio signal (i.e., the audio signal received at the plurality of microphones) may be represented by or modeled 206 as a plurality of noisy modulator signals, $\tilde{m}_{k,p}$ (e.g., noisy modulator signal 414). In some implementations, speaker localization process 10 may estimate the noise power, $\sigma^2_{k,p}(n)$ (e.g., noise power 418), for the plurality of audio signals (e.g., audio signal 408). As such, the input SNR may be represented as shown below in Equation 7.

$$iSNR_{k,p} = \frac{m^2_{k,p}(n)}{\sigma^2_{k,p}(n)} \quad (7)$$

where $\sigma^2_{k,p}(n)$ is the noise power at microphone p.

In some implementations, speaker localization process 10 may perform 420 one or more enhancements to the plurality of modulator signals received by each microphone. For example and in some implementations, speaker localization process 10 may include filtering 208, via one or more filters, a subset of the plurality of modulator signals of the plurality audio signals. In some implementations, modulation domain filtering may include filtering 208 a subset of the plurality of modulator signals of a set of noisy signals (e.g., received audio signals) via one or more low-pass filters. In some implementations, filters may filter 208 the modulator of the noisy signal with a cut off set to e.g., 16 Hz. For example, it has been observed that filtering 208 modulator signals with a frequency greater than 16 Hz from the plurality of modulator signals may preserve the information in the speech relevant to speech intelligibility while reducing interference from background noise and reverberation. However, it will be appreciated that low-pass filters may be applied to filter 208 modulator signals at various frequencies and with various filter types (e.g., low-pass filters, band-pass filters, etc.), within the scope of the present disclosure.

In some implementations, speaker localization process 10 may include subtracting 210 one or more signals associated with one or more modulator signals from the plurality of modulator signals of the plurality of audio signals. For example, modulation domain noise subtraction 210 may be performed by subtracting 210 noisy modulators from the plurality of audio signals. In some implementations, speaker localization process 10 may subtract 210 one or more signals associated with one or more modulators from the plurality of signals. For example, the one or more signals associated with the one or more modulator signals may include an amplitude-scaled version or a filtered version of the modulator signal. In some implementations, the noisy modulators, or signals associated with noisy modulators, that do not contribute to speech sounds may be estimated via a voice activity detection (VAD) algorithms or applications (e.g., voice activity detection application 74) from non-speech frames. This may result in an enhanced signal, that is particularly effective in the presence of babble noise. In some implementations, speaker localization process 10 may subtract 210 the one or more signals associated with the one or more modulator signals from the plurality of modulator signals in response to filtering 208 a subset of the plurality of modulator signals from the plurality of audio signals. In other words, speaker localization process 10 may subtract 210 one or more signals associated with the one or more modulator signals from the filtered 208 subset of the plurality of modulator signals. In implementations where speaker localization process 10 subtracts 210 one or more signals associated with the one or more modulator signals from the filtered 208 subset of the plurality of modulator signals, the resulting signal may be significantly robust against background noise when compared to conventional localization processes. For example, speaker localization process 10 may perform 420 the one or more enhancements on the plurality of modulator signals (i.e., filter 208 a subset of the plurality of modulator signals from the plurality of audio signals and may subtract 210 one or more signals associated with the one or more modulator signals from the filtered 208 subset of the plurality of modulator signals) as shown in Equation 8 below.

$$\hat{m}_{k,p}(n) = (|\mathcal{G}[\tilde{m}_{k,p}(n)]|^r - \sigma_{k,p}^r(n))^{\frac{1}{r}} \quad (8)$$

Where $\hat{m}_{k,p}(n)$ represent a plurality of enhanced modulator signals (e.g., enhanced modulator signal 422), $\tilde{m}_{k,p}(n)$ represent a plurality of noisy modulator signals (e.g., noisy modulator signal 414), $G[\cdot]$ is the low-pass filtering operation, and r is the power exponent.

In some implementations, the narrowband output SNR of the filtered signals may be defined by speaker localization process 10 as the ratio of the processed modulator to the narrowband noise power (e.g., noise power 418) as shown below in Equation 9.

$$oSNR_{k,p} = \frac{\hat{m}_{k,p}^2(n)}{\sigma_{k,p}^2(n)} \quad (9)$$

In some implementations, speaker localization process 10 may localize 204 a plurality of speech sounds from the plurality of audio signals based upon, at least in part, the modulation properties of the plurality of audio signals. As discussed above, acoustic speaker localization may generally include using the audio signals received from a number of microphones (arranged into an array of known geometry) to find the direction of the sound source, in an unknown acoustic environment. As discussed above and in some implementations, speaker localization process 10 may localize the source of speech signals by estimating the location of the sound directly from the time delay of arrival (TDOA) between pairs of microphones, or the direction-of-arrival (DOA) of impinging sound waves to a microphone array, based on the sound wave propagation model of the direct-path sound waves and the positioning of the microphones. For example and in some implementations, localizing 204 the plurality of speech sounds from the plurality of audio signals may include modeling the signals received from a pair of microphones in a multichannel signal model as shown below in Equation 10.

$$x_q(n) = \beta x_p(n - f_s \tau) \quad (10)$$

where β and τ are relative amplitude and delay between microphones q and p, respectively, and where $f_s$ is the sampling frequency.

In some implementations, the relative delay between microphones may vary between −d/c and d/c, where d is the distance between the microphones and c is the speed of sound (343.2 meters/second) in air at 68° F. In some implementations, the relative delay, τ may relate to the direction-of-arrival (DOA) of the received signals, where the DOA, θ, may vary between −90 degrees and 90 degrees, as shown below in Equation 11.

$$\tau = d \sin \theta / c \quad (11)$$

In some implementations, the relative delay between microphones may be much smaller than the period of the modulator signals. As such, speaker localization process 10 may omit the relative delay between the modulators of the microphones which may allow Equation 1 to be substituted into Equation 10 to yield Equation 12 as shown below.

$$x_q(n) = \sum_{k=0}^{K-1} \beta m_{k,p} c_{k,p}(n - f_s \tau) \quad (12)$$

In some implementations, localizing 204 the plurality of speech sounds from the plurality of audio signals may include computing 212 the cross-correlation of the plurality of audio signals received by a pair of microphones of the plurality of microphones. In some implementations, cross-correlation may generally include a measure of similarity of two signals as a function of the delay and/or displacement in time of one relative to the other. For example, an audio signal may be received by a first microphone (e.g., microphone 316) of an array of microphones (e.g., microphone array 314) before the same audio signal is received by a second microphone (e.g., microphone 318) of the array of microphones. As discussed above, the signals received by each microphone may differ in terms of amplitude and/or delay.

For example, generalized cross-correlation with the phase transform (GCC-PHAT) method may be expressed as shown below in Equation 13.

$$\hat{\tau}_{GCC-PHAT} = \arg \max_\tau R_{p,q}(\tau) \quad (13)$$

where $R_{p,q}(\tau)$ is the generalized cross-correlation function for the given signals of two microphones, p and q, and the delay corresponding to the maximum correlation corresponds to the TDOA.

In some implementations, the cross-correlation between signals is generally computed (such as for conventional GCC-PHAT) with Fourier transforms of the microphone signals and a weight to normalize magnitudes or amplitudes of transformed signals, leaving only phase or delay differences between the signals received by each microphone. In some implementations and as discussed above, within the modulation domain, the carrier signals of the plurality of audio signals may have unit-magnitude and therefore do not require normalization like conventional cross-correlation approaches. In this manner and referring again to FIG. 4, speaker localization process 10 may compute 212 the cross-correlation between pairs of carriers of noisy signals (i.e., $\hat{c}_{k,p}(n)$ (e.g., carrier signal 412) and $\hat{c}_{k,q}(n)$ (e.g., carrier signal 424)) as opposed to normalized audio signals resulting from the Fourier transform per conventional GCC-PHAT.

In some implementations, the cross-correlation (e.g., cross-correlation 426) may be computed 214 by speaker localization process 10 as shown below in Equation 14.

$$R_{p,q}(\tau) = \sum_{k=0}^{K-1} \eta_k \hat{c}_{k,q}(n) \hat{c}_{k,q}(n)^* e^{j\omega_k f_s \tau} \quad (14)$$

where the superscript * is the complex conjugate operator and $\omega_k$ is the frequency of the kth band in rad/s.

In some implementations, localizing 204 the plurality of speech sounds from the plurality of audio signals may include applying 214 a weight to at least a subset of the plurality of audio signals based upon, at least in part, a signal-to-noise ratio (SNR) of the plurality of audio signals. In some implementations, the subset of the plurality of audio signals may include applying a weight to at least a subset of the plurality of carrier signals of the plurality of audio signals received by the plurality of microphones as shown in Equation 14. In some implementations, a weight, $\eta_k$ (e.g., weight 428) may be applied 214 to the cross-correlation computed 212 by speaker localization process 10. In some implementations, the weight may be a uniform weight (e.g., 1 for all k, where k is the number of frequency bands), a non-uniform weight as shown below in Equation 15 that is specific to particular frequency bands, and/or a binary mask as shown below in Equation 16.

$$\eta_k = S_k = \sqrt{SNR_{k,p} SNR_{k,q}} \quad (15)$$

In some implementations, the $SNR_{k,p}$ and $SNR_{k,q}$ may be either the input SNR (i.e., iSNR of Equation 7) or the output SNR (i.e., oSNR of Equation 9) of each microphone.

In some implementations, a binary mask may be applied 214 as a binary weight (e.g., weight 428) to the frequency spectrum and may control the contribution of each frequency band to the narrowband SNR. In some implementations, a scalar value, $\delta_k$ may define a threshold to select frequencies which have a sufficiently high SNR. In some implementations, $\delta_k$ may be user-defined (e.g., via a user interface) and/or may be defined (e.g., as a default value) by speaker localization process 10. In some implementations, $\delta_k$ may be adjusted by a user from a default value. It will be appreciated that $\delta_k$ may be defined or re-defined in a variety of ways within the scope of the present disclosure.

$$\eta_k = \begin{cases} r_k, & S_k \geq \delta_k \\ 0, & S_k < \delta_k \end{cases} \quad (16)$$

In some implementations, the binary mask value, $r_k$ may be a fixed value and/or may be applied based upon at least in part a probability of speech sounds being present in at least a portion of the plurality of audio signals. For example, speech may not be present at all frequencies and the binary mask value may be defined as a probability that speech is present within or at a particular frequency bin. In some implementations, the binary mask value may be defined as a probability from statistics of the enhanced modulators as shown below in Equation 17.

$$\hat{r}_k = \frac{\sum_n \hat{m}_{k,p}(n)}{\sum_k \sum_n \hat{m}_{k,p}(n)} \quad (17)$$

where $\hat{m}_{k,p}(n)$ is an enhanced modulator (e.g., modulator signal 422) generated in response to filtering 208 at least a subset of the plurality of modulator signals from the plurality of audio signals and/or subtracting 210 one or more modulator signals from the filtered subset of modulator signals.

In some implementations, speaker localization process 10 may improve the conventional GCC-PHAT by generating a noise-robust GCC-PHAT. For example and as discussed above, with the cross-correlation computed with the carrier signals from a pair of microphones and/or the application of a weight to the cross-correlation, speaker localization process 10 may produce a GCC-PHAT that is better suited for applications with background noise and/or reverberations.

In some implementations, the noise robust GCC-PHAT may be used by speaker localization process 10 to generate a noise-robust SRP-PHAT. As is known in the art, conventional SRP-PHAT interpolates the sum of cross-correlations of multiple microphone pairs. When modified by the noise-robust GCC-PHAT of speaker localization process 10 as shown in Equation 14, a noise-robust SRP-PHAT may be generated as shown below in Equation 18.

$$\hat{\tau}_{SRP-PHAT} = \text{argmax}_\tau \sum_{p=1}^{M} \sum_{q=1}^{M} R_{p,q}(\tau) \quad (18)$$

where M is the total number of microphones in the array.

In an example of speaker localization process 10, a speaker is placed at x=0.5 meters (m), y=2.5 m, and z=1.3 m in a rectangular room with dimensions, x=3 m, y=4 m, and z=3 m using the method disclosed by E. A. P. Habets, "Room impulse response generator," Technische Universiteit Eindhoven, Eindhoven, Netherlands, Tech. Remp., 2010, ver. 2.0.20100920. In this embodiment, a uniform linear array (ULA) is used with a center at x=1.5 m, y=0.5 m, and z=2.5 m and a distance between microphones of d=0.08 m. A simulated source to microphone impulse response is convolved with speech signals with 177 seconds of speech spoken by two male and three female speakers, where the speech signals are from the Keele database as disclosed by F. Plante, G. F. Meyer, and W. A. Ainsworth, "A pitch extraction reference database," in Proc. Eurospeech, September 1995, pp. 837-840. A diffuse white Gaussian noise (WGN) is added to simulate a spherical isotopic noise field. The sampling frequency is set to 8.0 kHz and K=401 non-overlapping filters centered at uniform analytical subbands, resulting in uniformly-spaced filters with 10 Hz spacing. The DOA of the speaker was determined with a ground truth DOA of θ=−23.9° and a root mean squared error (RMSE) of the results in the periods with voice activities is calculated.

In this example, uniform, non-uniform, and binary mask weights are applied to embodiments of speaker localization process 10 as discussed above with a threshold, $\delta_k$=1 in cross-correlation estimation. For the non-uniform weights, both iSNR and oSNR are applied as weights as shown above in Equation 15. These results are compared to an oracle binary mask weight that is configured to estimate the narrowband SNR from modulators of a clean audio signal. Additionally, non-uniformly weighted versions of the GCC-PHAT and SRP-PHAT methods are shown for differing noise levels and in rooms with differing amounts of reverberations. For the GCC-PHAT method, the distance between microphones is d=0.32 m.

Figure 7:
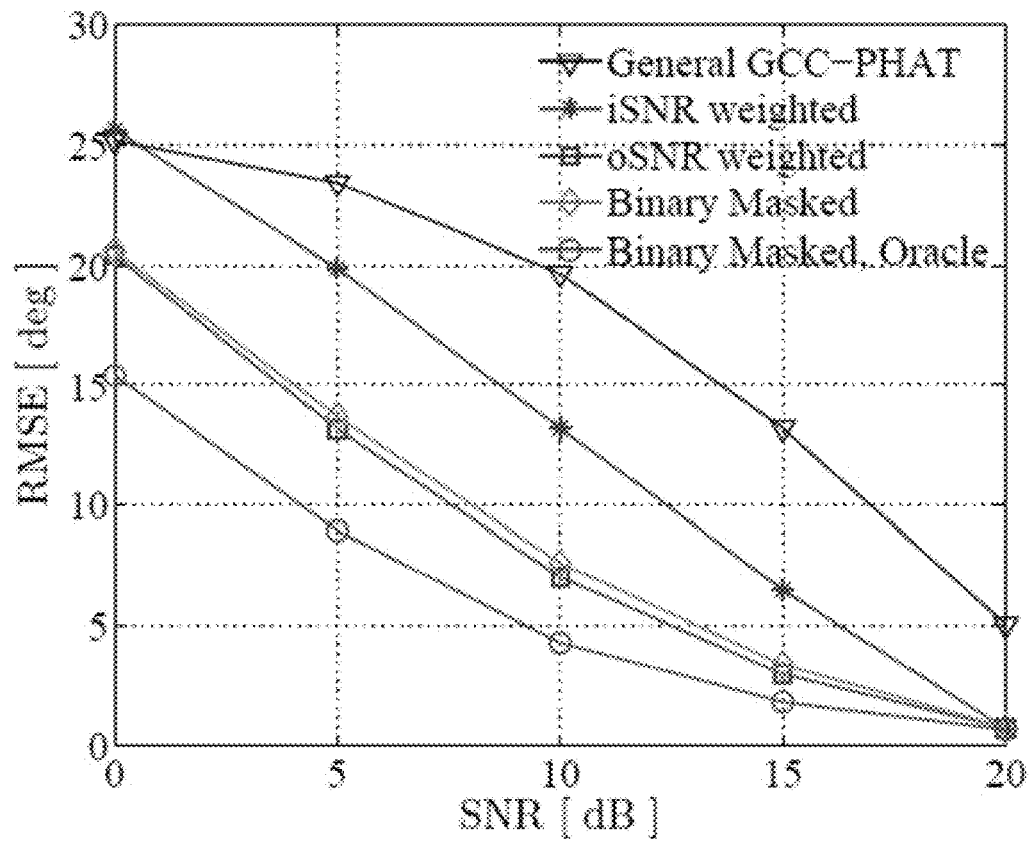
FIG. 7 is a diagrammatic view of a generalized cross-correlation with phase transform (GCC-PHAT) analysis according to one implementation of the speaker localization process of FIG. 1, where the root mean square error (RMSE) of several direction-of-arrival (DOA) estimates in an anechoic room with white Gaussian noise (WGN)

Referring also to FIG. 7, with SNRs larger than or equal to 5 dB, the non-uniform weighting methods have a smaller RMSE than the general method using the uniform weight and the embodiment of speaker localization process 10 using oSNR has a smaller RMSE than the embodiment of speaker localization process 10 using iSNR. The non-uniform embodiment of speaker localization process 10 using oSNR and the binary mask has results close to each other in the GCC-PHAT method.

As can be seen from FIG. 7, embodiments of speaker localization process 10 may outperform uniformly weighted conventional GCC-PHAT localization approaches by 15° RMSE in anechoic conditions.

In some implementations, embodiments of speaker localization process 10 may be used in ambient speech applications, such as Dragon® Speech Recognition Software available from Nuance Communications, Inc. of Burlington, Mass., with multiple distant microphones or for a health care application where the doctor and patient speech is acquired through a microphone array; Dragon is a registered trademark of Nuance Communications, Inc. in the United States, other countries or both. In some implementations, embodiments of speaker localization process 10 may be utilized for speech enhancement techniques like beamforming. For example, in a connected car application, embodiments of speaker localization process 10 may help improve the beamforming performance—leading to a cleaner speech acquisition, which in turn would improve ASR performance. In some implementations, embodiments of speaker localization process 10 may be used to extract spatial features for speaker diarization systems (i.e., systems configured to partition an input audio stream into homogeneous segments according to the speaker identity).

Figure 8:
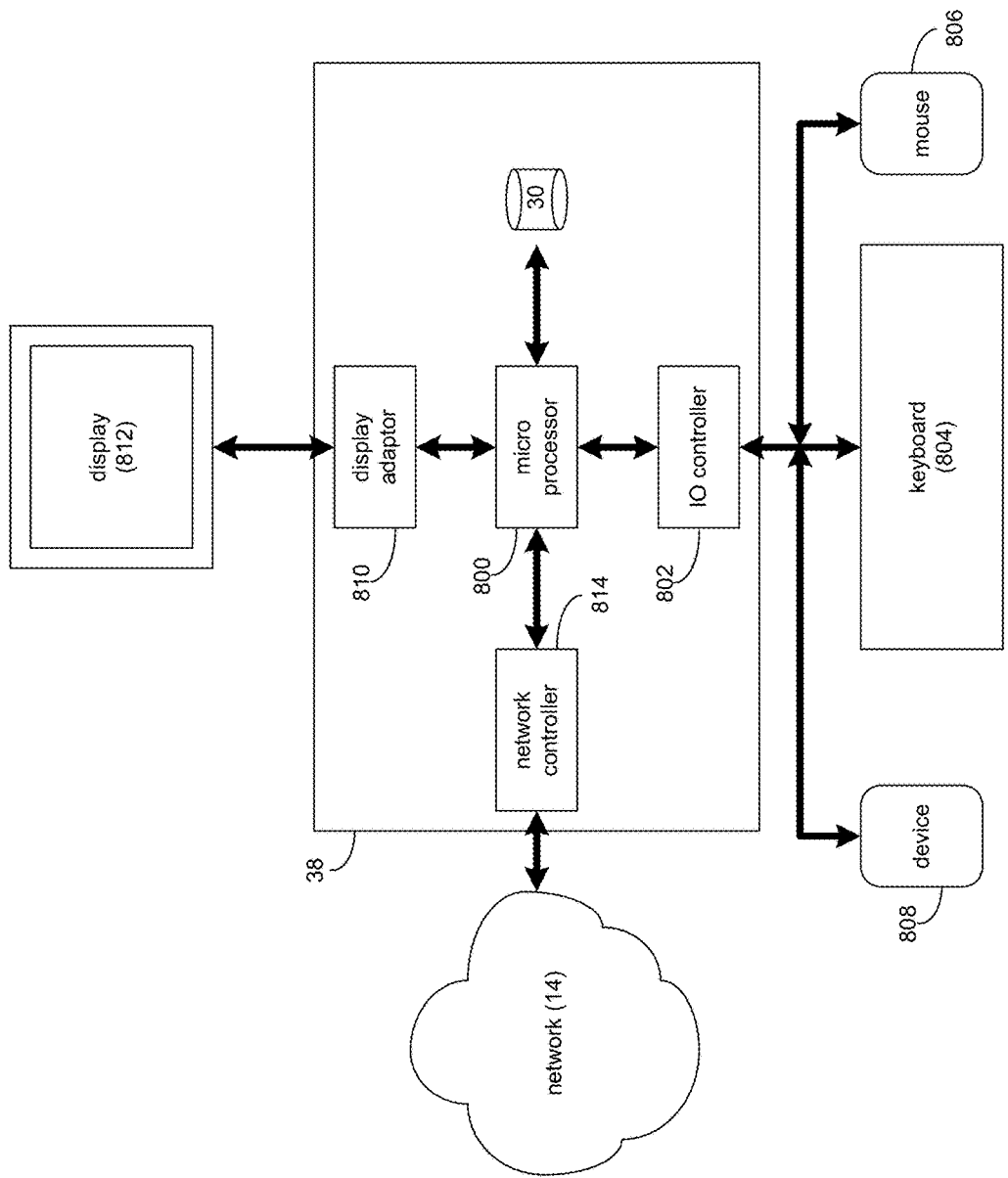
FIG. 8 is an example diagrammatic view of a client electronic device of FIG. 1 according to one or more example implementations of the disclosure.

Referring also to FIG. 8, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, speaker localization process 10 may be substituted for client electronic device 38 within FIG. 8, examples of which may include but are not limited to computing device 12 and/or client electronic devices 40, 42, 44.

Client electronic device 38 may include a processor and/or microprocessor (e.g., microprocessor 800) configured to, e.g., process data and execute the above-noted code/instruction sets and subroutines. Microprocessor 800 may be coupled via a storage adaptor (not shown) to the above-noted storage device(s) (e.g., storage device 30). An I/O controller (e.g., I/O controller 802) may be configured to couple microprocessor 800 with various devices, such as keyboard 804, pointing/selecting device (e.g., mouse 806), custom device, such a microphone (e.g., device 808), USB ports (not shown), and printer ports (not shown). A display adaptor (e.g., display adaptor 810) may be configured to couple display 812 (e.g., CRT or LCD monitor(s)) with microprocessor 800, while network controller/adaptor 814 (e.g., an Ethernet adaptor) may be configured to couple microprocessor 800 to the above-noted network 14 (e.g., the Internet or a local area network).

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method for acoustic speech localization, executed on a computing device, comprising:
   receiving, via a plurality of microphones, a plurality of audio signals;
   analyzing, at the computing device, modulation properties of the plurality of audio signals; and
   localizing speech sounds from the plurality of audio signals based upon, at least in part, the modulation properties of the plurality of audio signals.

2. The computer-implemented method of claim 1, wherein analyzing the modulation properties of the plurality of audio signals includes:
   modeling the plurality of audio signals in the modulation domain as a plurality of carrier signals and a plurality of modulator signals.

3. The computer-implemented method of claim 2, further comprising:
   filtering, via one or more filters, a subset of the plurality of modulator signals of the plurality audio signals.

4. The computer-implemented method of claim 2, further comprising:
   subtracting one or more signals associated with one or more modulator signals from the plurality of modulator signals of the plurality of audio signals.

5. The computer-implemented method of claim 1, wherein localizing speech sounds from the plurality of audio signals includes:
   computing a cross-correlation of the plurality of audio signals received by one or more pairs of microphones of the plurality of microphones.

6. The computer-implemented method of claim 5, wherein localizing speech sounds from the plurality of audio signals includes:
   applying a weight to at least a subset of the plurality of audio signals based upon, at least in part, a signal-to-noise ratio (SNR) of the plurality of audio signals.

7. The computer-implemented method of claim 6, wherein the weight is applied based upon at least in part a probability of speech sounds being present in at least a portion of the plurality of audio signals.

8. A computer program product residing on a non-transitory computer readable medium having a plurality of instructions stored thereon which, when executed by a processor, cause the processor to perform operations comprising:
   receiving, via a plurality of microphones, a plurality of audio signals;
   analyzing modulation properties of the plurality of audio signals; and
   localizing speech sounds from the plurality of audio signals based upon, at least in part, the modulation properties of the plurality of audio signals.

9. The computer program product of claim 8, wherein analyzing the modulation properties of the plurality of audio signals includes:
   modeling the plurality of audio signals in the modulation domain as a plurality of carrier signals and a plurality of modulator signals.

10. The computer program product of claim 9, further comprising:

filtering, via one or more filters, a subset of the plurality of modulator signals of the plurality audio signals.

11. The computer program product of claim 9, further comprising:
   subtracting one or more signals associated with one or more modulator signals from the plurality of modulator signals of the plurality of audio signals.

12. The computer program product of claim 8, wherein localizing speech sounds from the plurality of audio signals includes:
   computing a cross-correlation of the plurality of audio signals received by one or more pairs of microphones of the plurality of microphones.

13. The computer program product of claim 12, wherein localizing speech sounds from the plurality of audio signals includes:
   applying a weight mask to at least a subset of the plurality of audio signals based upon, at least in part, a signal-to-noise ratio (SNR) of the plurality of audio signals.

14. The computer program product of claim 13, wherein the weight mask is applied based upon at least in part a probability of speech sounds being present in at least a portion of the plurality of audio signals.

15. A computing system including a processor and memory configured to perform operations comprising:
   receiving, via a plurality of microphones, a plurality of audio signals;
   analyzing modulation properties of the plurality of audio signals; and
   localizing speech sounds from the plurality of audio signals based upon, at least in part, the modulation properties of the plurality of audio signals.

16. The computing system of claim 15, wherein analyzing the modulation properties of the plurality of audio signals includes:
   modeling the plurality of audio signals in the modulation domain as a plurality of carrier signals and a plurality of modulator signals.

17. The computing system of claim 16, further comprising:
   filtering, via one or more filters, a subset of the plurality of modulator signals of the plurality audio signals.

18. The computing system of claim 16, further comprising:
   subtracting one or more signals associated with one or more modulator signals from the plurality of modulator signals of the plurality of audio signals.

19. The computing system of claim 15, wherein localizing speech sounds from the plurality of audio signals includes:
   computing a cross-correlation of the plurality of audio signals received by one or more pairs of microphones of the plurality of microphones.

20. The computing system of claim 19, wherein localizing speech sounds from the plurality of audio signals includes:
   applying a weight mask to at least a subset of the plurality of audio signals based upon, at least in part, a signal-to-noise ratio (SNR) of the plurality of audio signals.

* * * * *